(12) United States Patent
Elliott et al.

(10) Patent No.: US 7,044,471 B2
(45) Date of Patent: May 16, 2006

(54) CARTRIDGE-TYPE MECHANICAL SEAL AND BACK PLATE

(76) Inventors: Robert L. Elliott, 5849 Caribbean Cir., Stockton, CA (US) 95210; Bryan D. Hampton, 18765 Messick Rd., Linden, CA (US) 95236

( * ) Notice: Subject to any disclaimer, the term of this patent is extended or adjusted under 35 U.S.C. 154(b) by 144 days.

(21) Appl. No.: 10/740,094

(22) Filed: Dec. 17, 2003

(65) Prior Publication Data

US 2005/0134002 A1 Jun. 23, 2005

(51) Int. Cl.
*F16J 15/44* (2006.01)

(52) U.S. Cl. .................. 277/412; 277/418; 277/419; 277/420

(58) Field of Classification Search ................ 277/412, 277/418, 419, 420, 421
See application file for complete search history.

(56) References Cited

U.S. PATENT DOCUMENTS

| | | | | |
|---|---|---|---|---|
| 5,024,451 | A * | 6/1991 | Borowski | 277/412 |
| 5,290,047 | A * | 3/1994 | Duffee et al. | 277/419 |
| 5,662,340 | A | 9/1997 | Besette et al. | |
| 6,290,234 | B1 * | 9/2001 | Eberle et al. | 277/411 |
| 6,386,546 | B1 * | 5/2002 | Fedorovich | 277/351 |
| 6,471,215 | B1 * | 10/2002 | Drago et al. | 277/412 |

OTHER PUBLICATIONS

Delta Mechanical Seals, Specification Sheet for "Delta Single Cartridge Seal, Style 3000", Copyright 1997.
Delta Mechanical Seals, Specification Sheet for "Delta Single Stationary Bellows Cartridge Seal, Style 3100", Copyright 1997.
Sunair Co., Advertising Brochure for "A.E.S. International Mechanical Seals For Pumps And Mixers".
FLOWSERVE, Advertising Brochure for "ISC Series Seals Innovative Standard Cartridge", Copyright Mar. 1999.
FLEX-A-SEAL, Advertising Brochure, "Sealing Solutions Worldwide".
FLEX-A-SEAL, Advertising Brochure, "Integrated Cartridge System".

* cited by examiner

*Primary Examiner*—Enoch E. Peavey
(74) *Attorney, Agent, or Firm*—R. Michael West

(57) ABSTRACT

A cartridge seal is co-axially secured within the circular aperture of a back plate bolted to a pump housing. Annular recesses are provided around inner and outer sides of the back plate, surrounding the circular aperture. The cartridge-type seal includes a stationary gland assembly and a rotatable shaft collar assembly. The inner side of the gland assembly includes a taper bore surrounding the pump drive shaft, and a circumferential lip. The lip nests within the inner annular recess of the back plate. The outer side of the gland assembly includes a circumferential groove. The collar assembly is locked to the drive shaft by means of setscrews. A snap-ring within the circumferential groove of the gland assembly is located within the outer side recess of the back plate. The snap-ring precludes axial movement of the gland assembly, while allowing quick removal and replacement of the cartridge seal.

13 Claims, 5 Drawing Sheets

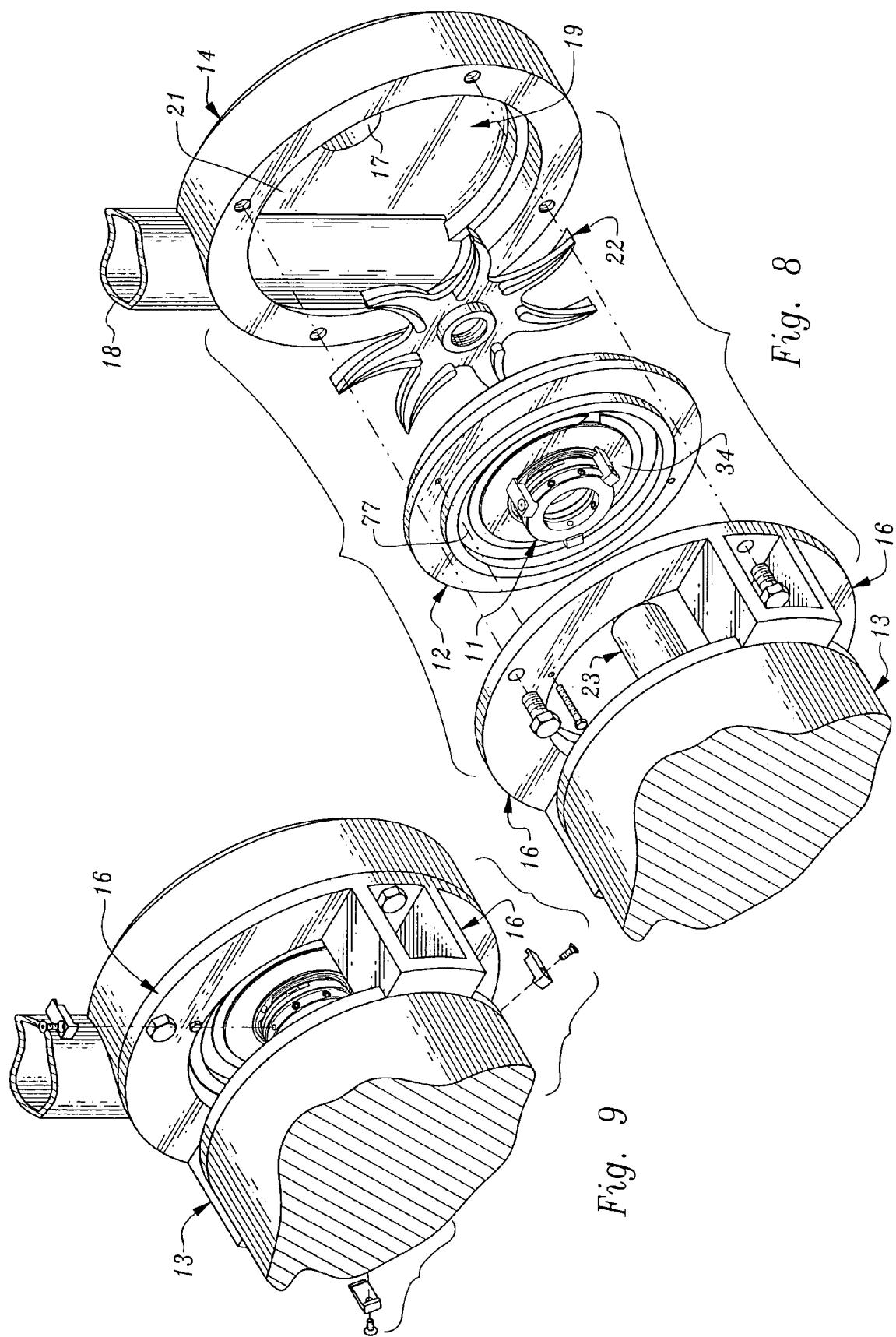

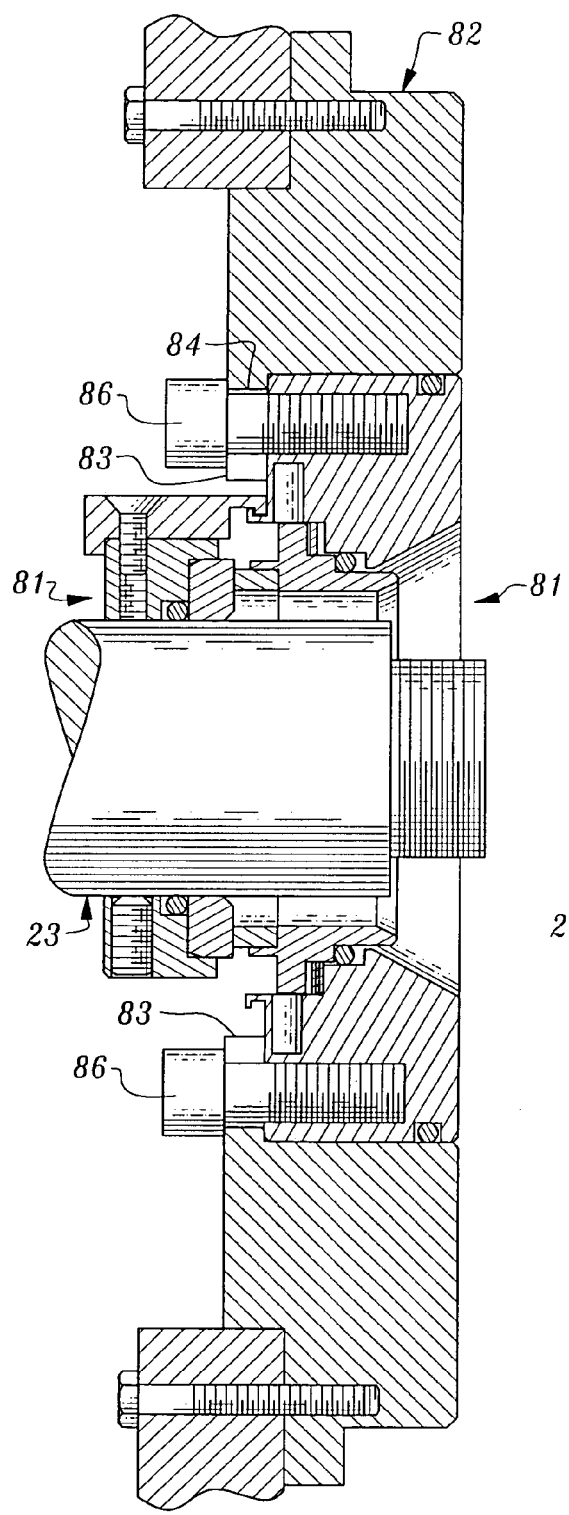
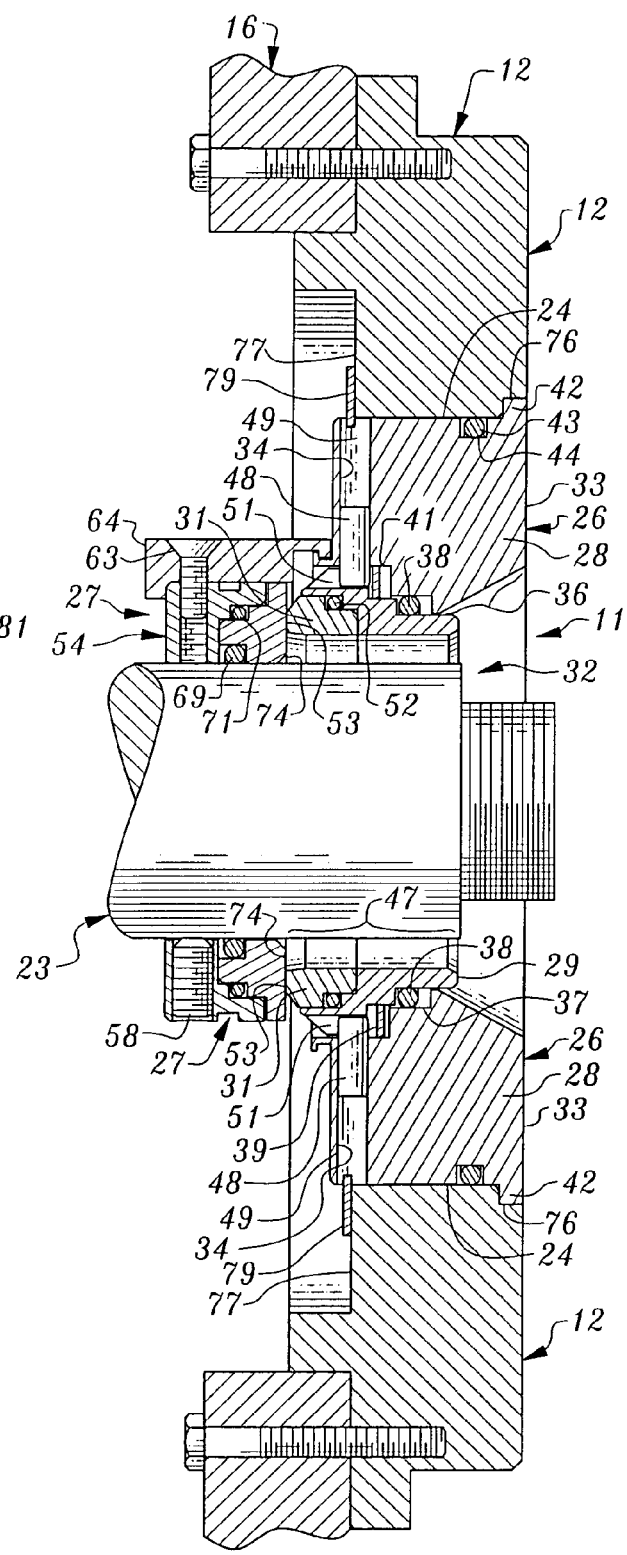
Fig. 10
(Prior Art)
Fig. 11

CARTRIDGE-TYPE MECHANICAL SEAL AND BACK PLATE

BACKGROUND OF THE INVENTION

1. Field of the Invention

The invention relates generally to mechanical seals used to prevent fluid leakage from pumps, mixing vessels, gear boxes, and other containers containing a fluid and which are penetrated by a rotatable element. More particularly, the invention pertains to a cartridge-type mechanical seal and a back plate, adapted to replace the conventional gland and "stuffing box" seal of a fluid pump.

2. Description of the Prior Art

The oldest mechanical pump designs used a gland to prevent leakage of fluid around the rotatable pump shaft. The gland comprised a sleeve within a "stuffing box" fitted over the drive shaft for the pump's impeller. The sleeve was tightened over compressible packing material to such an extent as to prevent fluid leakage around the shaft, while allowing the shaft to rotate. This design suffered from wear and contamination of the packing material, which eventually resulted in fluid leakage around the gland.

Later designs contemplated the replacement of the packing material with a cartridge-type mechanical seal, located within the seal cavity or "stuffing box" of the pump. Prior art mechanical seals commonly included a metal cylindrical sleeve, positioned around the pump shaft. At one end of the sleeve, an O-ring extended between the shaft and a groove in the inner wall of the sleeve, providing a first seal. Mechanical seals additionally included rotary and stationary components having contacting faces to provide the primary hydraulic seal. For adequate seal performance, a relatively tight contact between the two sealing faces must be maintained at all times. For that purpose, biasing means urging the sealing faces of the rotary and stationary components together were employed. Biasing means was provided by a spring located between the end of the seal sleeve and the rotary or stationary components of the seal to be maintained in sealing relation.

Most prior art cartridge mechanical seals for centrifugal pumps are designed for installation into the above-referenced "stuffing box". The pump "stuffing box", adapted to retain packing material of indefinite dimensions and an adaptable configuration, makes a poor fit for mechanical seals having a definite size and configuration. It is not uncommon that minimum dimensions of $1/32"$ to $1/16"$ exist between seal assembly and the "stuffing box" bore. Such a tight fit inhibits even moderate circulation of pumped fluids in the vicinity of the seal assembly. Consequently, seal lubrication and cooling are inadequate, and solids within the pumped product may lodge and compact within the seal itself. If the seal fails prematurely from these effects, product contamination from exposure to air or other foreign material may occur.

In an attempt to overcome premature seal failure, various systems for flushing the "stuffing box" or the contained seal gland, have been developed. These systems include, active fluid circulation devices, circulation rings, and double mechanical seals with the addition of flushing media. These remedial systems add to the complexity and cost of the mechanical seals, without really solving the underlying problem: the location of the seal itself.

Lastly, from a maintenance perspective, locating the mechanical seal in the "stuffing box" makes maintenance or repair a difficult proposition. In order to service, replace, or repair the mechanical seal, the "stuffing box" has to be removed from the pump housing. Thus, a major disassembly and re-assembly procedure is required. In addition, the tight fit of the prior art cartridge seal within the "stuffing box" bore also makes installation and removal of the seal difficult.

However, there is no need or requirement that mechanical seals be located in a "stuffing box". It is believed that this practice is merely a carry-over from the historical usage of the "stuffing box" to contain packing material, and one which should be abandoned by the industry.

Therefore, it is an object of the present invention to provide a cartridge-type mechanical seal construction, which removes the mechanical seal from the "stuffing box" and relocates it in a position proximate the pump impeller.

It is a further object of the construction disclosed herein, to effect installation and removal of the cartridge-type mechanical seal requiring less time and effort for disassembly and re-assembly of the pump than was previously required.

It is yet another object of the present invention to provide a mechanical seal construction providing large clearances between the pump shaft and the sealing faces for better lubrication, cooling, and self-cleaning action.

These and other object of the present invention will be described in the drawings and in the detailed description of the preferred embodiment set forth below.

SUMMARY OF THE INVENTION

The combination of the present invention comprises a cartridge seal and a back plate. This combination replaces the conventional gland or cartridge seal mounted in the "stuffing box" of the pump housing for a fluid pump powered by a motor. By mounting the cartridge seal within the back plate attached to the pump housing, the seal is readily accessible for service and replacement. In addition, the cartridge seal of the present invention is sleeveless, providing closer tolerances between the rotatable components of the seal and the shaft, than known prior art constructions.

The cartridge seal is co-axially secured within a circular cartridge aperture passing through the back plate. The outer, motor side of the back plate is bolted to the power frame adapter of the pump housing. The cartridge seal includes a stationary gland assembly and a rotatable shaft collar assembly. The gland assembly includes taper bore and linear bore sections, both surrounding the pump drive shaft in spaced relation. The space between the bore sections and the shaft allows the pumped liquid product to circulate in and around the sealing faces between the stationary and rotatable assemblies. This provides improved cooling and lubrication for the cartridge seal. The gland assembly also includes a circumferential lip, adapted for engagement with the inner, pump side of the back plate.

Annular recesses are provided around inner and outer sides of the back plate, surrounding the circular aperture. The circumferential lip of the gland assembly nests within the inner side annular recess of the back plate. A snap-ring around the outer side of the gland assembly is located within the outer side annular recess of the back plate. The snap-ring and outer lip in combination with the annular recesses in the back plate, preclude axial movement of the gland assembly during normal pump operation. The snap-ring is easily both removed and installed from the gland assembly, facilitating quick removal and replacement of the entire cartridge seal.

Retainer clips temporarily hold the rotatable shaft collar assembly together and in coaxial alignment with the stationary gland assembly until the cartridge seal is secured to the shaft. Setscrews are used to secure the shaft collar assembly to the shaft. Then, the retainer clips are removed prior to pump start up.

BRIEF DESCRIPTION OF THE DRAWINGS

FIG. 8 is an exploded perspective view of a motor, the cartridge-type mechanical seal, and the impeller and pump housing;

FIG. 9 is perspective view of the components of FIG. 8, fully assembled, and further showing removal of the three retainer clips;

FIG. 10 is a cross-sectional view of a back plate and a mechanical seal of the prior art; and, FIG. 11 is a cross-sectional view of the back plate and mechanical seal of the present invention.

DETAILED DESCRIPTION OF THE PREFERRED EMBODIMENT

Figure 1:
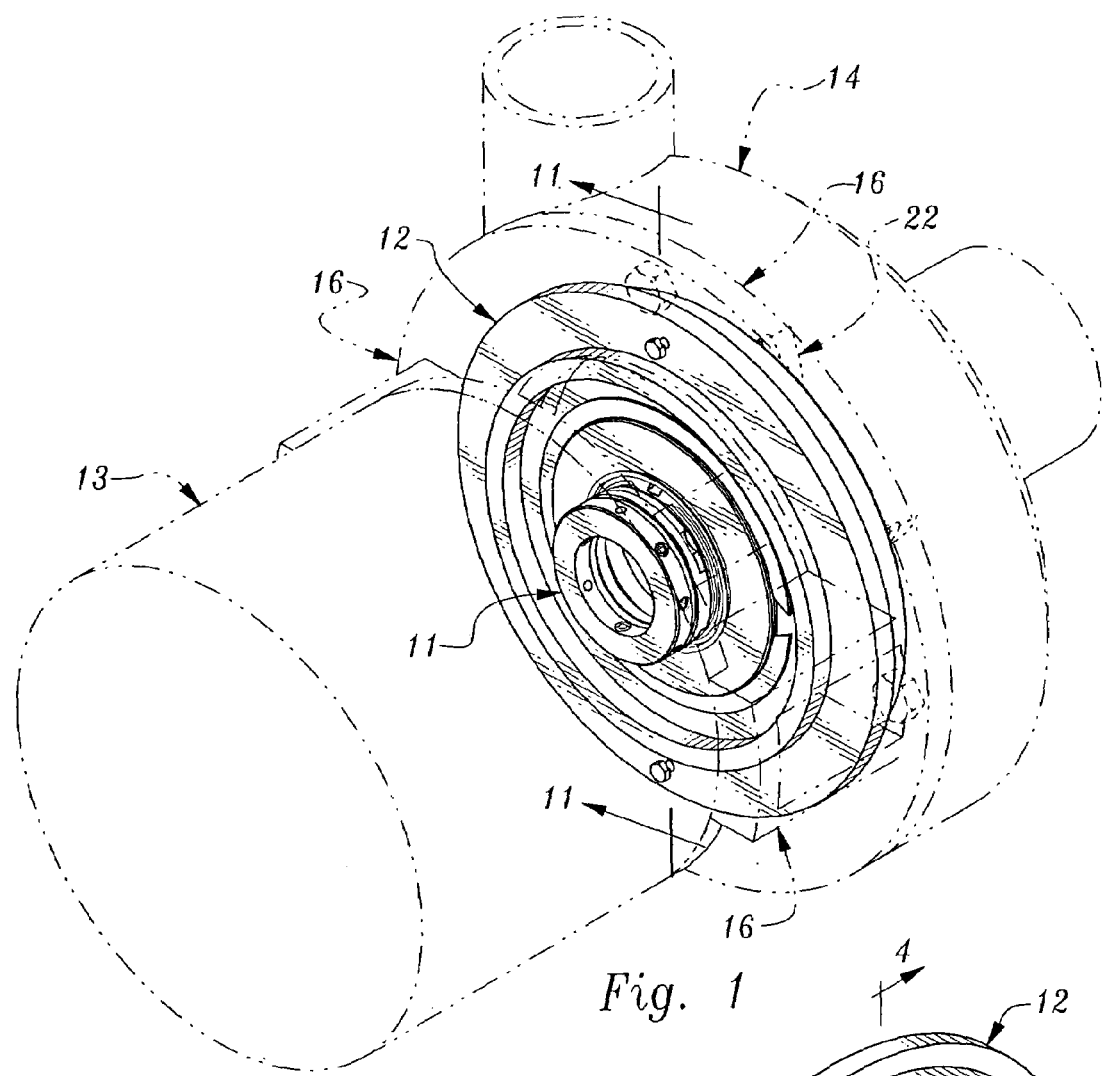
FIG. 1 is a perspective view of the cartridge-type mechanical seal of the present invention, the outline of an electric motor and an pump housing being shown in phantom line.

Turning now to the drawings, and in particular to FIG. 1, the assembled combination of a cartridge seal 11, a back plate 12, a pump motor 13, and a pump housing 14 is shown. In this example, showing a "close-coupled" pump, a power frame adapter 16 extends between the pump housing and the pump motor 13. However, the invention may also be adapted for use with a "frame-mounted" pump (not shown), in which the power frame adapter extending from the pump housing holds pump shaft bearings, and is not connected to the pump motor. In addition, for a "frame-mounted" pump, the shaft of the motor does not extend into the pump housing. Rather, a separate pump shaft extends from the power frame adapter, and is coupled in co-axial fashion to the shaft of the motor.

Pump housing 14 includes an inlet 17, an outlet 18, and a volute 19. Housing 14 further includes an open side 21 in fluid communication with volute 19. An impeller 22 is located within volute 19, and is mounted for rotation therein. For that purpose, pump motor shaft 23 extends through cartridge seal 11, and includes an end which is threadably affixed to and supports impeller 22.

Figure 6:
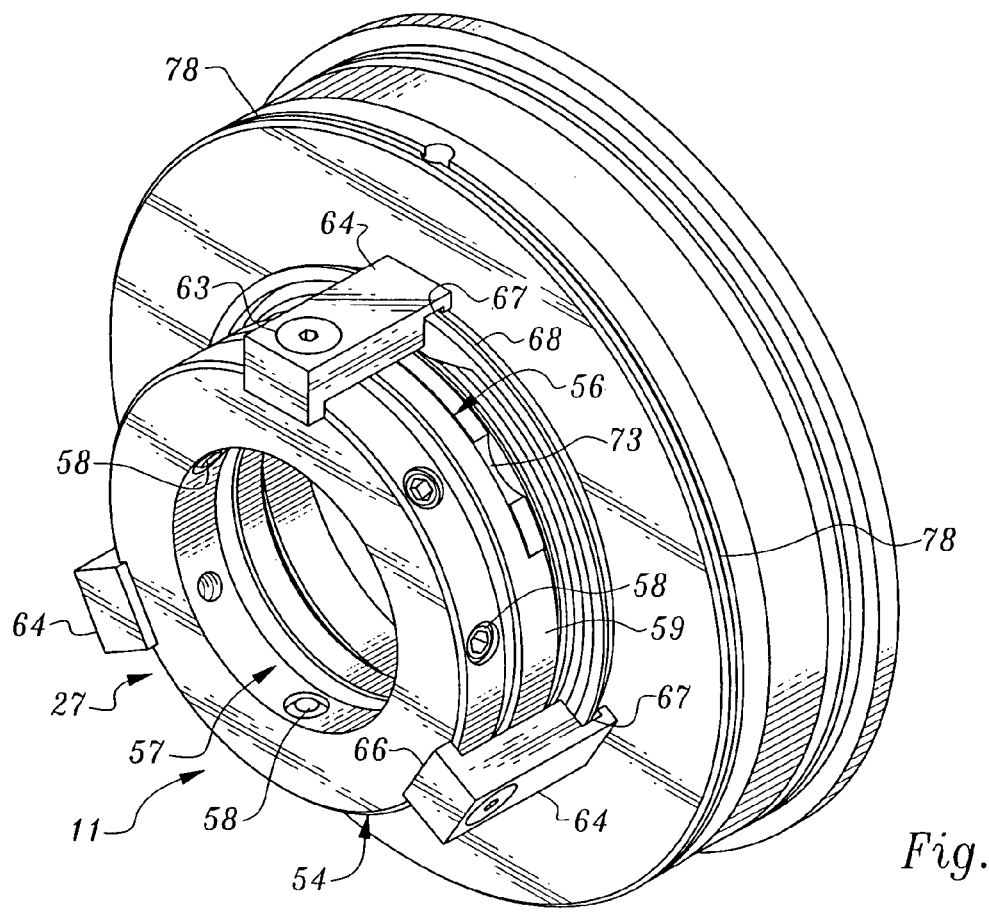
FIG. 6 is a perspective view, taken to an enlarged scale, of the assembled mechanical seal.
Figure 7:
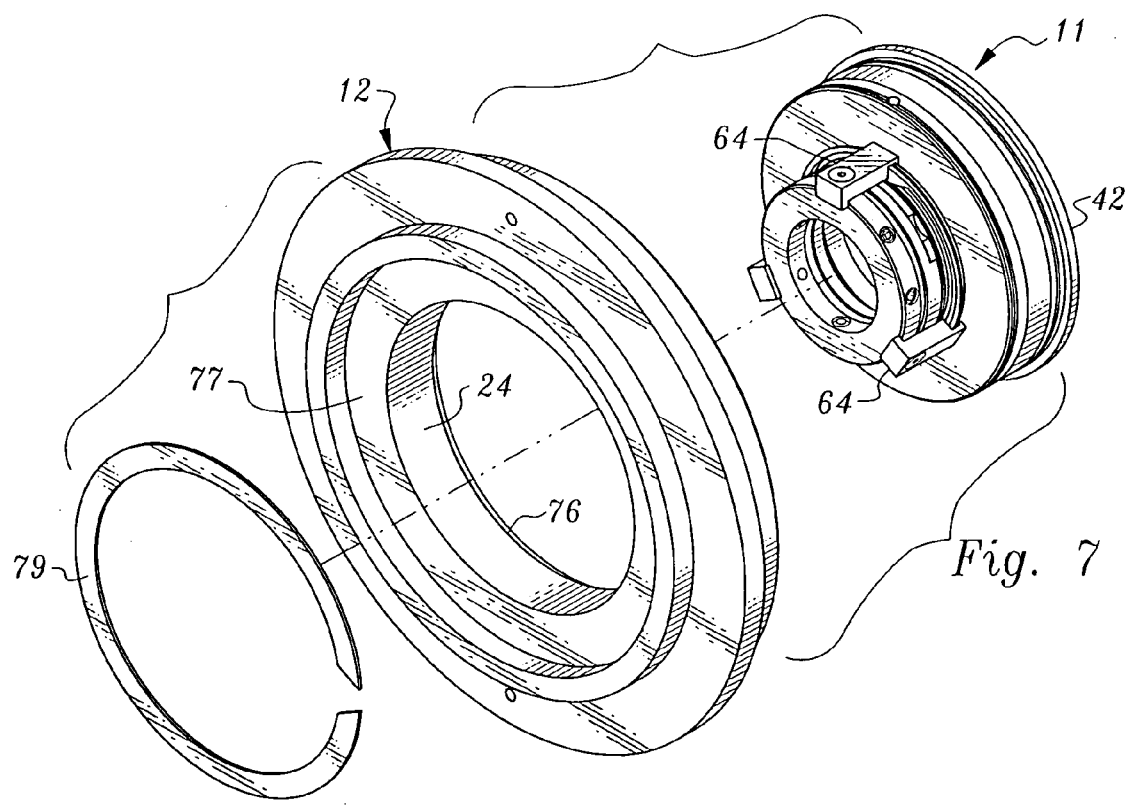
FIG. 7 is a perspective view of the assembled mechanical seal, the back plate, and the snap-ring.

As shown in FIGS. 6, 7, and 11, cartridge seal 11 is co-axially secured within a circular cartridge aperture 24 passing through the back plate 12. Both the specific features of the back plate and the manner in which the cartridge seal 11 is secured therein will be explained in more detail below.

The cartridge seal 12 includes a stationary gland assembly 26 and a rotatable shaft collar assembly 27. The stationary gland assembly 26 is comprised of a seal gland 28, a stationary retainer 29, and a stationary insert 31, shown in exploded relationship in FIG. 5. Stationary gland assembly 26 includes an axial bore 32, which extends from an inner side 33 to an outer side 34. Axial bore 32 includes a tapered section 36, extending downwardly from the inner side 33 toward the shaft 23, creating a toroidal volume around the shaft. A sealing recess 37 is provided in seal gland 28, to accommodate an O-ring 38. Seal gland 28 also includes a wave spring 39, installed within a notch 41. Wave spring 39 provides a resilient bias to maintain the certain components of the cartridge seal 12 in contingent sealing engagement, particularly prior to and during start-up conditions for the pump. A circumferential lip 42 is also provided on the inner side 33 of seal gland 28. Another O-ring 43 is provided within a circumferential groove 44.

The stationary retainer 29 has an inner side which is sized and configured to nest in coaxial relation within the axial bore 32, against the O-ring 38. The stationary retainer 29 includes one portion of a linear section 47 of the axial bore 32. Linear section 47 has a first diameter which is larger than the diameter of shaft 23, and extends substantially from the end of tapered section 36 proximate shaft 23, to the outer side of the gland assembly 26. Owing to the fact that the tapered section 36 and the linear section 47 are maintained in spaced relation from shaft 23, a volume is created which is in fluid communication with the volute 19. This volume, which is filled with the same liquid product pumped through the pump housing 14, acts to cool, lubricate, and flush out the cartridge seal 11 and the liquid seal therein.

Stationary retainer 29 further includes rotational locking means extending between retainer 29 and the seal gland 28. For that purpose, diametrically opposed pins 48 and pin apertures 49 are provided, adjacent the outer side of seal gland 28. Upper and lower notches 51 are included in the outer periphery of retainer 29, to receive pins 48. In that manner, relative rotational movement between retainer 29 and gland 28 is prevented.

The last principal component of gland assembly 26 is the stationary insert 31. Insert 31 may be manufactured from a variety of materials, including silicon carbide, tungsten-carbide, carbon, ceramic, and bronze. As shown most clearly in FIG. 11, insert 31 is sized and configured to nest in coaxial relation within an outer side of stationary retainer 29. An O-ring 52 is included in the interface between retainer 29 and insert 31, both to provide a hydraulic seal and to ensure a measure of resilient frictional resistance between the two components.

The other portion of linear section 47 of axial bore 32 extends through stationary insert 31, allowing the pumped liquid product to enter and circulate through the volume between insert 31 and shaft 23. This volume extends to an outer side of insert 31, which is provided with a stationary seal face 53. In this manner, the stationary seal face 53 is lubricated and cooled by the pumped liquid product passing through the volume. In addition, the transverse dimension of this volume is sufficient to allow both ingress and egress of any solids which may be contained in the pumped liquid. For example, pumps used in paper mills must pump liquids containing paper particles. These particles may pass freely through the volume surrounding the shaft 23 without clogging or compacting the seal components of the present invention.

Figures 4, 5:
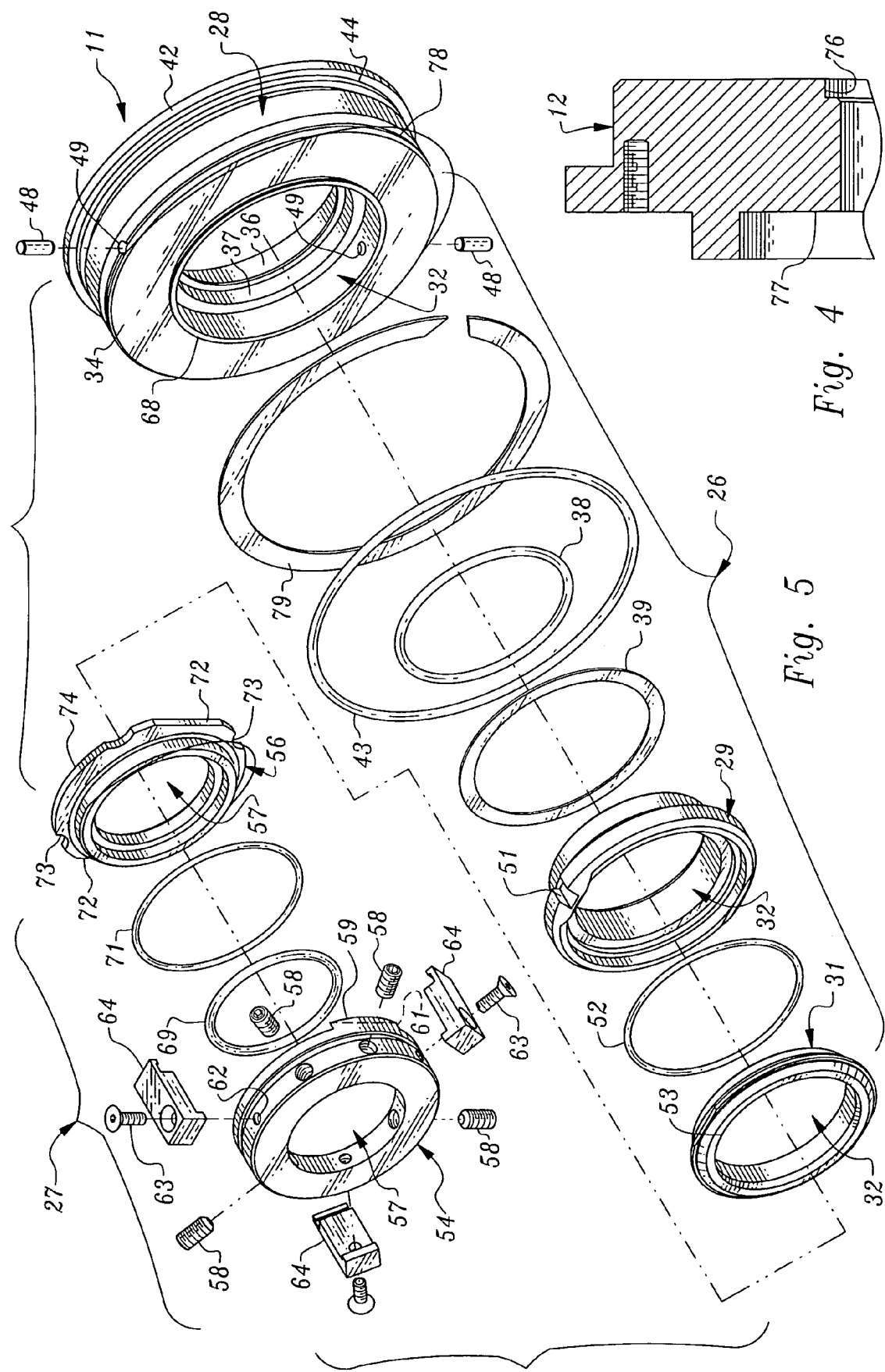
FIG. 4 is a fragmentary, cross-sectional view taken on the line 4—4, in FIG. 3.
FIG. 5 is an exploded perspective view of the cartridge-type mechanical seal, including the stationary gland assembly and the rotatable shaft collar assembly.

The rotatable shaft collar assembly 27 is comprised of a rotating collar 54 and a rotatable insert 56, shown in the exploded perspective view of FIG. 5. An axial hole 57, having a second diameter, passes entirely through rotatable shaft collar assembly 27, including collar 54 and insert 56. The dimension of this second diameter is slightly larger than shaft 23, allowing the shaft to be inserted through the axial hole 57 easily.

Rotatable shaft collar 54 includes means in communication with axial hole 57 for securing collar 54 to the shaft 23. More particularly the securing means comprises a plurality of set screws 58, threaded into collar 54 to impinge radially upon shaft 23. When the set screws 58 are tightened against the shaft 23, they effectively reduce the working diameter of the axial hole 57 within collar 54, locking the two structures together. The rotary forces of the shaft 23 are thereby imparted to shaft collar 54.

The outside edge of collar 54 also includes a pair of retainer ears 59, extending inwardly toward rotatable insert 56. Although arcuate the outside, the inside edge 61 of each of the ears presents a flat surface. This inside edge is represented by broken lines shown in FIG. 5. The retaining function of ears 59 will be explained more fully below, in connection with the rotatable insert 56.

Rotatable shaft collar 54 is also provided with threaded holes 62 to accommodate screws 63, which temporarily secure three clips 64 in place. Because the cartridge seal 11 has many separate parts, means must be provided to retain the parts together before the seal is installed for use. Clips 64 include at one end a lower side extension 66 which overlaps the outer face of collar assembly 27, and a lower side slot 67 at the other end which registers over a circular rib 68 on the outer side of seal gland 28.

The rotatable shaft collar assembly 27 also includes the rotatable insert 56, through which axial hole 57 also passes. The outer side of rotatable insert 56 includes a lower recess accommodating an O-ring 69, in sealing engagement with shaft 23. The outer side of insert 56 also includes an upper stepped portion fitted with an O-ring 71, in sealing engagement with rotating collar 54.

The outer periphery of rotatable insert 56 includes a pair of opposing flats 72. When insert 56 and collar 54 are assembled, the previously mentioned inside edges 61 of retainer ears 59 register with a respective flat 72. Since rotatable collar 54 is driven by the rotary forces imposed upon shaft 23, retainer ears 59 in conjunction with flats 72 impart those rotary forces upon insert 56 as well. A number of arcuate cutouts 73 are also located in spaced relation on the outer periphery of insert 56. Cutouts 73 are provided to create air turbulence around insert 56 when it is rotating, to provide more effective cooling of the insert.

Lastly, the inner side of rotating insert 56 is provided with a rotating seal face 74. As shown particularly in FIG. 11, with cartridge seal 11 installed, rotating seal face 74 and stationary seal face 53, are maintained in contingent, sealing relation. It should also be noted that a portion of rotating seal face 74 is also in fluid communication with the volume defined by the spaced relation between shaft 23 and the axial bore 32. In that way, the cooling and lubricating effects of the circulated liquid product are provided to the rotating seal face 74, as well.

The cartridge seal 11 is co-axially secured within the circular cartridge aperture 24 in a manner which facilitates easy removal and installation. As has been mentioned previously, a circumferential lip 42 is provided on the inner side 33 of seal gland 28 of cartridge seal 11. An inner annular recess 76 is provided on the inner side of the back plate 12, surrounding the cartridge aperture 24. When the cartridge seal 11 is aligned with and slid over the shaft 23 for installation, the circumferential lip 42 of the gland assembly 26 nests within annular recess 76 in the back plate 12.

An outer annular recess 77 is provided on the outer side of back plate 12, surrounding the outer side of the cartridge aperture 24. A circumferential groove 78 is provided on the outer side of seal gland 28. Applying outwardly directed pressure upon the inner side of the cartridge seal 11 maintains lip 42 within recess 76 while a snap-ring 79 is installed within groove 78. So installed, snap-ring 79 lies within the annular recess 77 of the back plate 12, and the cartridge seal 11 is secured within the cartridge aperture 24. The circumferential lip 42 in combination with inner annular recess 76 prevents outward axial movement of the cartridge seal 11. The snap-ring 79 in combination with outer annular recess 77 prevents inward axial movement of the cartridge seal 11. Since the rotatable shaft collar assembly 27 is locked to the shaft 23 by means of set screws 58, the rotating seal face and the stationary seal face are maintained in sealing relation by the same components which prevent axial movement of the cartridge seal 11 and secure it within the cartridge aperture 24.

After the cartridge seal 11 has been installed as described above and the set screws 58 have been tightened on the shaft 23, the three retainer clips 64 are removed. The only purpose of clips 64 is to hold the rotatable shaft collar assembly temporarily together and in coaxial alignment with the stationary gland assembly, until the cartridge seal is secured to the shaft and the back plate. Once that has been accomplished, the clips are removed so that normal pump operation can begin.

It is significant to note that the inner annular recess 76 and the outer annular recess 77 may be machined into the back plate of an existing pump. In other words, the existing pump of a customer may be retrofitted with the cartridge seal 11 by modifying the old back plate of the existing pump. This represents a significant savings in cost and time, while allowing full advantage to be taken of the easy installation and servicing features of the present invention.

Figure 2:
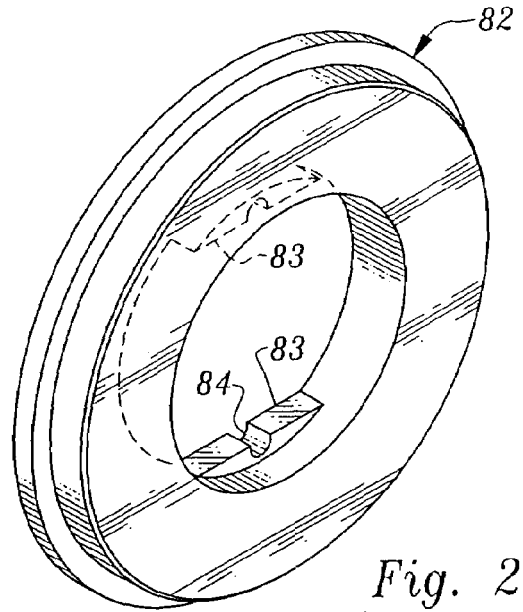
FIG. 2 is a perspective view of a prior art back plate.
Figure 3:
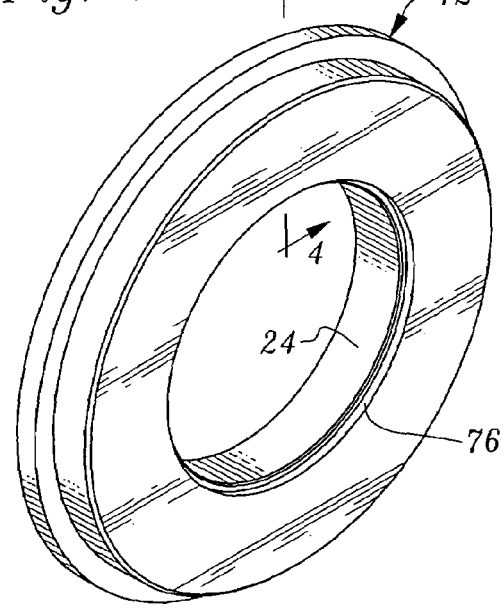
FIG. 3 is a perspective view of the back plate of the present invention.

This aspect may be appreciated by making reference to a prior art construction including cartridge seal 81 and back plate 82, shown in FIGS. 2 and 10. Back plate 82 includes upper and lower crescent-shaped flanges 83, on the outer side of the cartridge aperture. A slot 84 is provided in the center of each flange 83. Upper and lower bolts 86 pass through slots 84, and threadably engage the seal gland of seal 81. In that manner, seal 81 is secured within back plate 82.

The old back plate of an existing pump cannot easily or cost effectively be modified to include the additional material required by flanges 83. Welding such pieces to the customer's back plate simply costs too much, so the customer is forced to buy a new back plate, made like plate 82. Thus, adapting the prior art cartridge seal 81 to an existing pump requires a new back plate 82, specially made to accommodate the bolt mounting arrangement.

Yet another feature distinguishes the present seal cartridge and back plate combination from the prior art structure, shown in FIG. 10. Both for installation and removal of seal 81, the bolts 86 must be removed. To gain access to bolts 86, the additional step of removing the back plate from the power frame adapter of the pump is required.

Not so with the cartridge seal 11 and the back plate 12 of the present invention. In undertaking a seal replacement, for example, the pump housing and impeller are first removed. Then, the snap-ring 79 is removed, from the outside face of the back plate 12. This can be accomplished without any further disassembly or removal of the back plate from the power frame adapter. Finally, after loosening the set screws 58 of the old cartridge seal, the old seal is removed from the inner side of the back plate. After installing the new seal from the inner side of the back plate, the re-assembly process is carried out in reverse of that process just described.

The cartridge seal 81 is also different from cartridge seal 11 in that certain inner components of the prior art seal are maintained together and secured in place through a heat shrink technique. Using this technique, an oversized metal part, such as a retainer or a collar, is heated to expand. The heated part is then placed over a mating part, such as an insert seal, and allowed to cool. As the heated part cools, it shrinks over the mating part to secure it tightly. Such an assembly process for a manufacture or a disassembly process for service, is difficult if not impossible for a user/customer to accomplish in the field. Thus, these steps are normally only undertaken in a manufacturer's shop facility.

The cartridge seal 11 of the present invention preferably uses O-rings 52, 69 and 71 to secure the various components together, without the use or necessity of the heat shrink technique. These O-rings allow quick and easy assembly and disassembly, which can be accomplished in the field by a customer. Thus, if a need arises for an individual part within the cartridge seal 11 to be replaced, the O-ring connection system for these components disclosed facilitates that replacement process.

It will be appreciated, then, that we have disclosed a cartridge-type mechanical seal and an associated back plate, adapted to replace the conventional gland and "stuffing box" seal of a fluid pump, which employs a unique combination of inner and outer side mounting techniques for the seal providing quick and easy installation and removal of the seal with minimal disassembly of the pump.

What is claimed is:

1. A cartridge seal adapted to be mounted over a shaft comprising:
   a. a stationary gland assembly, said gland assembly having an inner side with a circumferential lip extending radially outwardly from said gland assembly and an axial bore to accommodate the shaft, said bore having a tapered portion extending inwardly to a first diameter, said stationary gland assembly further having an outer side provided with a stationary seal face and a circumferential groove;
   b. a removable snap-ring secured within said circumferential groove, said snap ring and said circumferential lip being parallel and in spaced relation;
   c. a rotatable shaft collar assembly, said collar assembly including an axial hole with a second diameter and means in communication with said axial hole for securing said collar assembly to the shaft, said collar assembly further including an inner side provided with a rotating seal face; and,
   d. means between said snap ring and said circumferential lip for maintaining said rotating seal face and said stationary seal face in sealing relation.

2. A cartridge seal as in claim 1 in which said first diameter is larger than said second diameter.

3. A cartridge seal as in claim 1 in which said rotatable shaft collar assembly includes sealing means between said axial hole and the shaft.

4. A cartridge seal as in claim 3 in which said sealing means comprises an O-ring.

5. A cartridge seal as in claim 1 in which said bore further includes a linear portion, said linear portion corresponding in dimension to said first diameter and extending substantially from an end of said taper portion proximate the shaft to said outer side of said gland assembly.

6. A cartridge seal and back plate adapted to be mounted over a shaft comprising:
   a. a stationary gland assembly, said gland assembly having an axial bore extending therethrough, said gland assembly further including: a seal gland having an inner side with a circumferential lip extending radially outwardly from said seal gland and an outer side with a circumferential groove, a removable snap-ring being located within said circumferential groove, said snap-ring and said circumferential lip being parallel and in spaced relation, said seal gland having a tapered section of said axial bore, said seal gland further including a sealing recess adjacent said tapered section; a retainer sized and configured to nest in coaxial relation within said sealing recess, said retainer having one portion of a linear section of said of said axial bore, said linear section having a first diameter; rotational locking means extending between said retainer and said seal gland; a stationary insert sized and configured to nest in coaxial relation within an outer portion of said retainer, said stationary insert having the other portion of said linear section of said axial bore, said stationary insert further having an outer side provided with a stationary seal face;
   b. a rotatable shaft collar assembly, said collar assembly including: a rotating collar having a first axial hole with a second diameter, said collar including means in communication with said first axial hole for securing said collar to the shaft; a rotatable insert having a second axial hole with said second diameter, said rotating insert having an inner side provided with a rotating seal face; and, means for securing said rotating collar to said rotating insert;
   c. a back plate having an inner side and an outer side, said back plate having a circular cartridge aperture passing therethrough extending from said inner side to said outer side, an inner annular recess being provided on an inner side of said cartridge aperture to accommodate said circumferential lip, and an outer annular recess being provided on said outer side of said back plate, said outer annular recess surrounding an outer side of said cartridge aperture and adapted to accommodate said snap-ring, whereby said rotating seal face and said stationary seal face are maintained in sealing relation.

7. A cartridge seal as in claim 6 in which said first diameter is larger than said second diameter.

8. A cartridge seal as in claim 6 in which said rotational locking means extending between said retainer and said seal gland comprises a pin.

9. A cartridge seal as in claim 6 in which said means for securing said rotating collar to said rotating insert comprises at least one tab extending outwardly toward said insert and a flat on an outer periphery of said insert adapted to register with said tab.

10. A cartridge seal as in claim 9 in which said outer periphery includes cooling means.

11. A cartridge seal as in claim 10 in which said cooling means comprises at least one cutout.

12. A pump comprising:
   a. a motor having an output drive shaft;
   b. a pump housing having a volute, an open side in communication with said volute, and a power frame adapter extending from said open side of said housing;
   c. an impeller, said impeller being located within said volute, and being attached to an end of said output drive shaft;
   d. a back plate, said back plate having an inner side and an outer side, said outer side being connected to said power frame adapter, said back plate further including a cartridge aperture therein, said cartridge aperture being axially coincident with a longitudinal axis of rotation of said output drive shaft;

e. a cartridge seal secured within said cartridge aperture, said cartridge seal comprising: a stationary gland assembly, said gland assembly having an inner side provided with a circumferential lip extending radially outwardly from said gland assembly and an axial bore coaxial with said axis of rotation of said drive shaft, said bore having a tapered portion extending inwardly toward said drive shaft to a first diameter, said gland assembly further having an outer side provided with a stationary seal face; and, a rotatable shaft collar assembly, said collar assembly including an axial hole, said axial hole having a second diameter and being coaxial with said axis of rotation of said drive shaft, and further including means in communication with said axial hole for securing said collar assembly to said drive shaft; said collar assembly further including an inner side provided with a rotating seal face; and, f. means for maintaining said rotating seal face and said stationary seal face in sealing relation, comprising: an outer annular recess on said outer side of said back plate, said outer annular recess extending around said cartridge aperture: a circumferential groove extending around said outer side of said stationary gland assembly; and, a removable snap-ring secured within said circumferential groove and lying within said outer annular recess; and, further including an inner annular recess on said inner side of said back plate, said inner annular recess extending around said cartridge aperture, and in which said circumferential lip of said gland assembly nests within said inner annular recess.

13. The combination comprising:

a. a cartridge seal including: a stationary gland assembly, said gland assembly having an inner side with a circumferential lip extending radially outwardly from said gland assembly and an axial bore, said bore having a tapered portion extending axially inwardly to a first diameter, said gland assembly further having an outer side provided with a stationary seal face and a circumferential groove, a removable snap-ring being located within said circumferential groove; and, a rotatable shaft collar assembly, said collar assembly including an axial hole with a second diameter and means in communication with said axial hole for selectively reducing said second diameter, said shaft collar assembly further including an inner side provided with a rotating seal face;

b. a back plate, said back plate having an inner side and an outer side and a cartridge aperture extending therebetween, said cartridge aperture being coaxial with said axial bore and said axial hole; and, c. means for securing said cartridge seal within said cartridge aperture, with said rotating seal face and said stationary seal face in sealing relation, said means comprising an inner annular recess on an inner side of said cartridge aperture to accommodate said circumferential lip, and an outer annular recess on said outer side of said back plate, said outer annular recess surrounding an outer side of said cartridge aperture and adapted to accommodate said snap ring.

* * * * *